Figure 1:
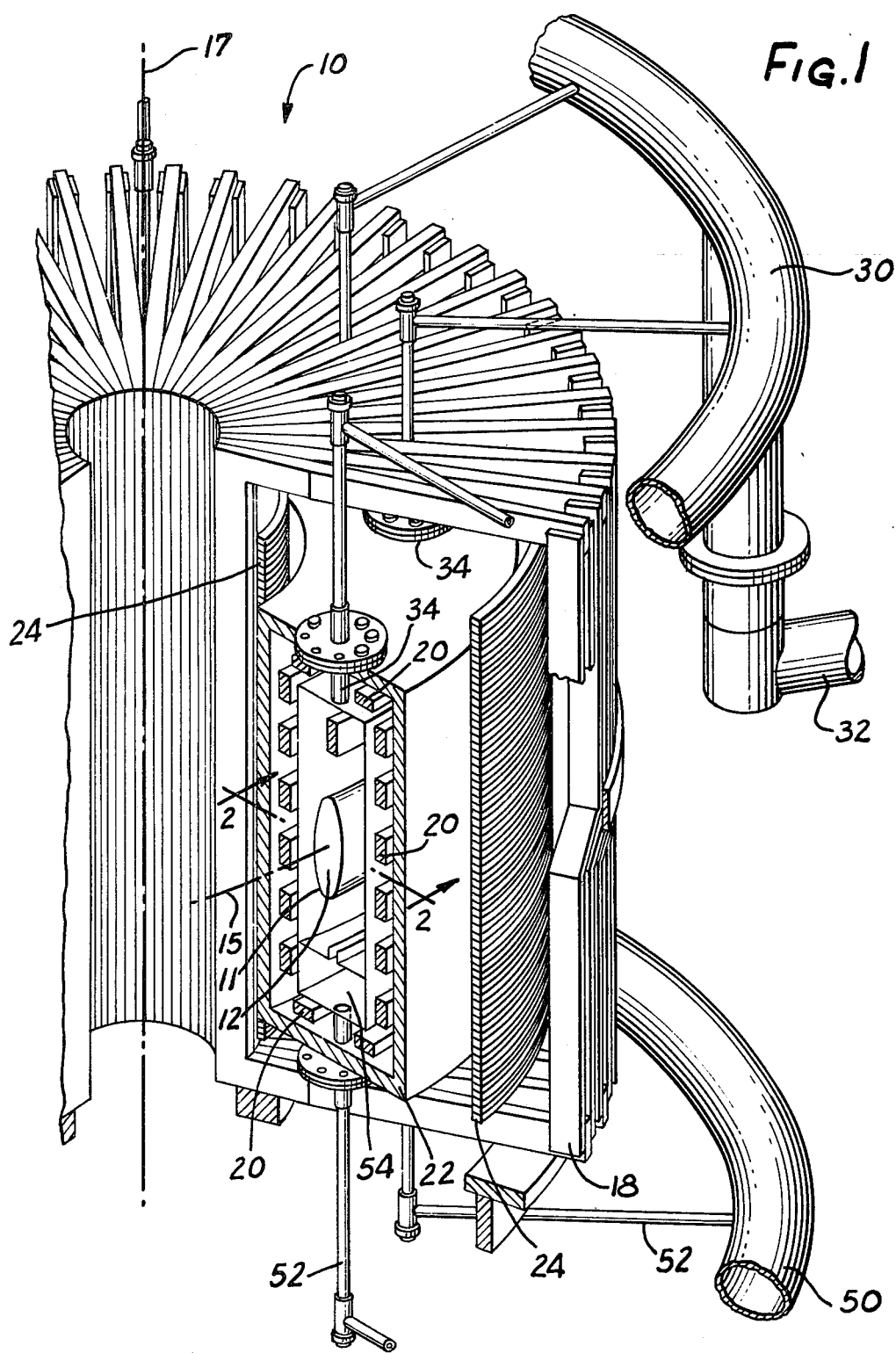

United States Patent [19]

Ohkawa

[11] 4,239,594

[45] Dec. 16, 1980

[54] CONTROL OF IMPURITIES IN TOROIDAL PLASMA DEVICES

[75] Inventor: Tihiro Ohkawa, La Jolla, Calif.

[73] Assignee: The United States of America as represented by the United States Department of Energy, Washington, D.C.

[21] Appl. No.: 608,985

[22] Filed: Aug. 29, 1975

[51] Int. Cl.² .............................................. G21B 1/00
[52] U.S. Cl. ............................................ 176/9; 176/3
[58] Field of Search ............................ 176/1, 3, 42, 9

[56] References Cited

U.S. PATENT DOCUMENTS

| 3,508,104 | 4/1970 | Braams | 176/3 |
| 3,523,209 | 8/1970 | Ohkawa et al. | 176/3 |
| 3,713,967 | 1/1973 | Hamilton et al. | 176/1 |
| 3,755,073 | 8/1973 | Haught et al. | 176/5 |
| 3,886,402 | 5/1975 | Furth et al. | 176/3 |

OTHER PUBLICATIONS

Matt-1039, Rutherford, (3/74).
CONF-740402-P1, (4/16-18/74), Husseiny et al., p. 423.
Nuclear Fusion, 8, (1968), pp. 173-181.
CONF-740402-P1, (4/16-18/74), Watson, pp. 608 & 612.
Parkin et al., (Apr. 1974, CONF-721111), pp. 63-85.
Physics Today, (11/75), p. 38.
Acronyms & Initialisms Dictionary, 4th Ed., Gale Research Co., Crowley et al., p. 572, Technology Review, (12/76), pp. 20-43.

*Primary Examiner*—Stephen C. Bentley
*Assistant Examiner*—S. A. Cangialosi
*Attorney, Agent, or Firm*—James E. Denny; Richard G. Besha; William E. Anderson

[57] ABSTRACT

A method and apparatus for plasma impurity control in closed flux plasma systems such as Tokamak reactors is disclosed. Local axisymmetrical injection of hydrogen gas is employed to reverse the normally inward flow of impurities into the plasma.

2 Claims, 3 Drawing Figures

CONTROL OF IMPURITIES IN TOROIDAL PLASMA DEVICES

The present invention relates generally to methods and apparatus for creating, controlling and/or confining plasma and, more particularly, is directed to plasma impurity control in such methods and apparatus.

Various devices have been developed for confining plasmas, which are ionized gases comprising approximately equal numbers of positively charged ions and free electrons at high temperatures. If a plasma is formed from a suitable gas or mixture of gases, such as deuterium or tritium, fusion reactions may occur within the plasma. Such fusion reactions may produce even more highly energized protons, neutrons or other particles. If the proper conditions are realized the energy obtained from the fusion reactions may exceed the input energy and provide useful power.

In order to achieve such results it is not only necessary to confine the plasma in a given region at extremely high temperatures for an appreciable period of time, but also to exclude the plasma from contact with solid container walls. Consequently, a large number of magnetic and electrical field configurations and apparatus for producing them have been developed or proposed in connection with the confining of plasma.

One general type of device for plasma confinement comprises an endless, closed tube, such as a toroid, with a geometrically coextensive externally imposed magnetic field, i.e., toroidal magnetic field in which magnetic lines of induction extend around the toroid generally parallel to its minor axis. Such a magnetic field is conventionally provided by electrical currents in one or more conductive coils encircling the minor axis of the toroid. Illustrative of such devices are the toroidal diffuse pinch plasma confinement devices of the Tokamak configuration. The toroidal configuration may be advantageously employed with plasmas of noncircular cross-section, such as plasma configurations which are axisymmetrically elongated in a direction parallel to the major toroidal axis. U.S. Pat. Nos. 3,692,626 entitled "Apparatus for Forming and Containing Plasma" and 3,801,438 entitled "Toroidal Apparatus for Confining Plasma" both to Tihiro Ohkawa, and assigned to the assignee of the present invention, illustrate plasma confinement apparatus of the toroidal type having a noncircular cross-section in a plane parallel to and intercepting the major toroidal axis.

An important difficulty in the initial formation and sustained maintenance of a high temperature plasma is the problem of excluding impurity atoms from the plasma, and the substantial and potentially disabling plasma energy losses which result from the presence of such impurities.

The impurities in a plasma generally originate from two principal sources. First, contaminants such as oxygen, nitrogen or carbon may be adsorbed on the chamber walls surrounding the plasma zone, and driven therefrom by the conditions which are employed to initially form the plasma. The other principal source of contaminants results from the bombardment of the chamber wall material itself by energetic plasma particles and radiation. Further, fusion reactions may generate high energy particles which will increase the problem of contaminants from wall bombardment. Suitable vacuum techniques and high temperature baking may be employed to minimize the adverse effect of absorbed contaminants, but the problem of contaminants produced by bombardment and erosion of the chamber walls have provided substantial difficulties. Complicated magnetic divertor systems have been designed in an effort to overcome the problem in some types of plasma confinement systems, but such divertors are expensive, complex and have various other disadvantages.

The presence in the plasma of impurities, such as those originating from the walls of the chamber surrounding the plasma, leads to undesirable energy loss in the form of radiation, which in turn has a deleterious effect on the formation and/or maintenance of a high temperature plasma. These energy losses arise because the contaminants generally have a higher atomic number than hydrogen, and the type of electronic excitation, ion recombination and bremsstrahlung radiation losses produced by their presence in a hydrogen (including its isotopes) plasma become increasingly deleterious with increasing atomic number of the contaminant.

The problem of plasma contamination by impurities may be further aggravated in toroidal confinement systems by the toroidal geometry itself. In toroidal plasma configurations, the inward flow of contaminant impurity ions from the chamber zone surrounding the plasma is enhanced by Pfirsch-Schluter effects. In this regard, each different contaminant ion species has a characteristic flow pattern in which an upward (or downward depending on the polarity of the toroidal magnetic field) flow with respect to the major axis, due to the toroidal drift in the toroidal configuration, is followed by the return flow along the magnetic field line. However, because of the difference of electric charge between the various species of impurity ions, the flow velocities of the different species are correspondingly different. The resulting collisional friction between the different species will disrupt the otherwise established pattern and result in the enhanced inward motion of impurity ions from the surrounding zone into the plasma. This effect has been analyzed in an article by P. Rutherford (Princeton Plasma Laboratory MATT-1039, 1974) which is incorporated herein by reference. The problem of plasma impurities such as those originating from chamber wall bombardment is a substantial obstacle to the development of toroidal fusion power generation systems.

Accordingly, it is an object of the present invention to provide a method and apparatus for control of impurity ions in toroidal plasma systems. It is a further object to provide such a method and apparatus which may be relatively simple, which do not unduly disrupt the delicate dynamics of the toroidal plasma confinement systems, and which may be used with existing toroidal systems without prohibitively substantial structural or design alterations.

Figure 2:
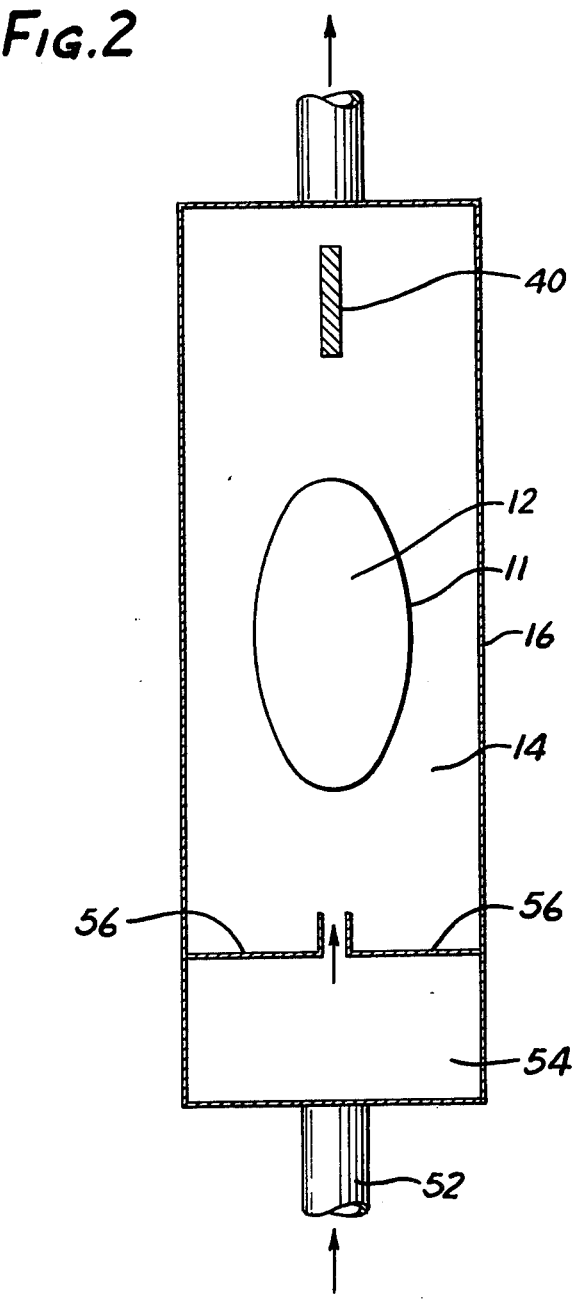
Figure 3:
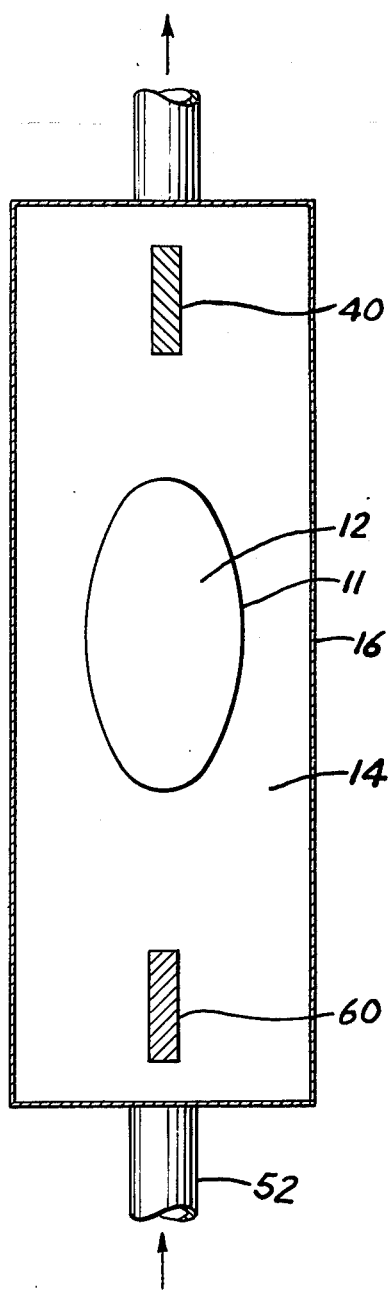

These and other objects of the present invention are more particularly set forth in the following detailed description and in the accompanying drawings of which FIG. 1 is a perspective view, partially broken away, of a toroidal plasma system illustrating an embodiment of the present invention;

FIG. 2 is a cross-sectional view taken through line 2—2 of the plasma chamber of the toroidal plasma system of FIG. 1; and FIG. 3 is a cross-sectional view of a plasma chamber similar to that of FIG. 2 illustrating another embodiment of the present invention.

Generally, the present invention is directed to methods and apparatus for the control of impurity flow into toroidal plasma systems by providing an axisymmetric source of hydrogen in a zone adjacent the plasma and displaced from the plasma in a direction along the major toroidal axis opposite the direction of positive ion toroidal drift, and by providing a particle sink in a zone adjacent the plasma and displaced from the plasma along the major toroidal axis in the direction of positive ion toroidal drift.

The apparatus of the present invention comprises the elements of toroidal plasma confinement systems, preferably of Tokamak design and more preferably of Tokamak design and having a noncircular plasma cross section which is elongated in a direction along the major toroidal axis. Such Tokamak systems for the containment of high-temperature plasmas comprise means for providing a strong, toroidal magnetic field in which the plasma ring is to be embedded, and which is generally provided by electrical current in one or more conductive coils encircling the minor toroidal axis. Such systems also comprise means for providing a toroidal electric field to maintain a toroidal current flowing in the plasma, and this plasma current in turn generates a magnetic field component which is poloidal. The combination of the poloidal magnetic field with the toroidal magnetic field produces resultant magnetic field lines that lie on closed, nested magnetic surfaces, and the plasma is subjected to confining, constricting forces generated by the current flowing in it. The toroidal confinement systems may also include various means to modify the plasma cross section, or otherwise exert magnetic, electrical or electromagnetic influence on the plasma.

The apparatus of the present invention further includes hydrogen source means for axisymmetrically providing hydrogen in a zone adjacent the plasma, and particle sink means as indicated hereinabove. The apparatus in one sense may be regarded as an improvement to toroidal plasma confinement systems and is contemplated for use with existing and future toroidal confinement designs.

The method of the present invention involves the provision of the hydrogen adjacent the plasma and the provision of the particle sink oppositely adjacent the plasma as indicated hereinabove. The method further contemplates evacuation of the particle sink zone.

The strength of the hydrogen source in the invention should best be sufficient to reverse the inward flow of impurities into the plasma, as will be described in more detail hereinafter.

The invention will now be more particularly described with specific reference to the toroidal plasma confinement system illustrated in FIGS. 1 and 2 of the drawings.

Illustrated in FIG. 1 is a toroidal plasma confinement apparatus 10 of the Tokamak type including an embodiment of the present invention and adapted for providing a plasma 12 of non circular cross-section. The plasma 10 is illustrated in somewhat idealized form in that the plasma boundary 11 will generally not be as discrete as shown. However, the illustrated boundary 11 is shown to contain the principal, effective portion of the plasma 12 for the purposes of the present description. The minor axis is shown at reference numeral 15. The plasma is contained in a toroidal zone 14 of square cross section which is defined by the chamber 16 and which is generally radially symmetrical about the longitudinal major toroidal axis 17 of the apparatus 10. The chamber 16 is generally hermetically sealed, with the exception of various access ports, and the walls of the vacuum chamber 16 may be protected by a liner (not shown) fabricated of graphite, silicon carbide, or some other suitable low atomic number material which minimizes the impurity effects of wall material sputtered back into the plasma as a result of charged particle bombardment of the liner.

External of the chamber 16 is the toroidal field magnet coil 18. The toroidal coil is in the form of a helically wound rectangular conduction array which encircles the plasma 12, zone 14, chamber 16, and various other elements of the system.

Field stabilizing coils are provided around the chamber 16 in a direction parallel to the minor axis 15, which function to control the configuration of the plasma and to provide plasma stability.

A secondary vacuum tank and shield 22 is provided externally of the field shaping coils 20. The secondary vacuum tank shields the outside coils and surrounding environment.

Externally of the secondary vacuum tank 22, but inside the toroidal field coil 18, is an additional set of magnet coils 24. These coils 24 are electric field induction coils which function to ionize the plasma 12 and induce the plasma current. A radially symmetrical manifold array 30, which may be connected to a vacuum system (not shown) via outlet pipe 32, communicates with the interior of the vacuum chamber 16 along the top side of the plasma chamber by means of pumping ports 34 and the associated piping.

The interior assembly of the chamber 16, with which the illustrated embodiment of the present invention is directly concerned, is also shown in FIG. 2. Located axisymmetrically about the top side of the interior of the chamber 16 and adjacent the plasma 12 is a limiter finger or rail 40. The rail 40 may be made of a suitable material capable of withstanding high temperature, such as molybdenum or tungsten, and is so located as to function as a particle sink as will be more fully described hereinafter.

Located at the bottom of the zone 16 is a second manifold system 50 which is used to supply hydrogen gas axisymmetrically to the interior of the chamber 16 adjacent the bottom side of the plasma 12. In this regard, the hydrogen gas supply pipes 52 of the hydrogen supply manifold system 50 communicate with a hydrogen manifold zone 54 located at the bottom of the plasma chamber 16, which is defined by walls 56. The zone 54 has an axisymmetrical orifice 58 which uniformly distributes hydrogen supplied to the interior of the zone 54 by supply ports and pipes 52, to the region of the plasma zone 14 adjacent the underside of the plasma 12.

The illustrated apparatus 10 has a toroidal magnetic field which will produce a positive ion toroidal drift in the upward direction along the major axis 17, and this orientation will be treated as the positive polarity in the following mathematical analysis.

In operation, the axisymmetrical introduction of hydrogen acts as a perturbation of the dynamics of the plasma contamination mechanism through provision of a hydrogen source and particle sink localized in the minor azimuthal positions. The relative velocity of hydrogen and impurity ions is reversed by this perturbation so that the inward flow of impurities may be reversed.

The hydrogen source should be of sufficient strength to accomplish the desired perturbation, and an analysis of the required source strength may proceed as follows:

The basic plasma equations, as set forth in the above identified Rutherford article, are:

$$O = -\nabla p_i + n_i e[\vec{E} + \vec{v_i} \times \vec{B}] + \vec{R} \tag{1}$$

$$O = -\nabla p_I + n_I Z_I e[\vec{E} + \vec{v_I} \times \vec{B}] - \vec{R} \tag{2}$$

$$R_{\parallel} = -C_1 \frac{m_i n_i n_I}{n_i \tau_{iI}} u_{\parallel} \tag{3}$$

where
- $P_i$ is the ion pressure
- $n_i$ is the ion density
- $\vec{E}$ is the electric field
- $\vec{v_i}$ is the plasma ion velocity
- $\vec{B}$ is the magnetic field
- $\vec{R}$ is the defined drag-viscosity term
- $e$ is the electric charge
- $P_I$ is the impurity ion pressure
- $Z_I$ is the impurity ion charge
- $C_1$ is a numerical constant in the range of 1 to 0.29
- $m_i$ is the plasma ion mass
- $n_I$ is the impurity ion density
- $R_{\parallel}$ is the parallel component of $\vec{R}$
- $u_{\parallel}$ is the parallel component of $\vec{u}$
- $v_I$ is the impurity ion velocity and where $$\vec{u} = \vec{v_i} - \vec{v_I}$$

$$n_I \tau_{iI} = 3 m_i^{\frac{1}{2}} T_i^{3/2} / 4(2\pi)^{\frac{1}{2}} Z_1^2 e^4 \ln \Lambda$$

where
- $\tau_{iI}$ is the plasma ion — impurity ion collision time
- $T_i$ is the plasma ion temperature and
- $\Lambda$ is the plasma Debye length function.

The toroidal component of the velocity, $u_T$, comes from the $\Theta$— dependent part of $u_\Theta$, the poloidal angle. Analysis of the perturbational effect of the particle source system at the minor azimuthal positions may proceed with analyses of the affect on $u_\Theta$.

It follows from analyses of Equation (1) and Equation (2) that $$u_\Theta = \frac{B_\Theta}{B_T} u_T + \frac{1}{eB_T}\left[\frac{1}{n_i}\frac{\partial p_i}{\partial r} - \frac{1}{n_I Z_I}\frac{\partial p_I}{\partial r}\right] \tag{4}$$

where
- $B_\Theta$ is the poloidal magnetic field
- $B_T$ is the toroidal magnetic field and
- $r$ is the minor toroidal radius.

Further, by assuming the plasma density is approximately uniform in the $\Theta$-direction, we obtain $$\frac{\partial}{r\partial\theta}\left(1 + \frac{r}{R}\cos\theta\right)u_\Theta = \frac{S_i}{n_i} - \frac{S_I}{n_I} \tag{5}$$

where $S_i$ and $S_I$ are the sources for the proton and impurity ions where $r/R$ is the ratio of the minor radius to the major radius.

By making the further assumption in connection with the behavior of $S_i$ and $S_I$ in the theta direction that the proton source quantity minus the impurity source quantity is a function of the sine of the poloidal angle:

$$\frac{S_i}{n_i} - \frac{S_I}{n_I} = -(1/\tau_s)\sin\theta \tag{6}$$

where $1/\tau_s$ is the source strength in units of particles per second then the velocity, $u_\Theta$, is given by $$u_\Theta = \frac{1}{eBT_o}\left(\frac{1}{n_i}\frac{\partial p_i}{\partial r} - \frac{1}{n_I Z_I}\frac{\partial p_I}{\partial r}\right)\left(1 - \frac{r}{R}\cos\theta\right) + (r/\tau_s)\cos\theta \tag{7}$$

By combining Equations (4) and (7) the perturbational effects of external proton source with respect to the toroidal component of the velocity may be derived as follows:

$$u_T = -\frac{2r\cos\theta}{eRB_{\theta o}}\left(\frac{1}{n_i}\frac{\partial p_i}{\partial r} - \frac{1}{n_I Z}\frac{\partial p_I}{\partial r}\right) + \frac{B_{To}}{B_{\theta o}}\frac{r}{\tau_s}\cos\theta \tag{8}$$

where
the subscript o represents the evaluation of the function at the minor axis (i.e., the minor radius=o)
and R is the major radius.

Recognizing that the two factors at the left side of Equation (8) represent, respectively, the toroidal impurity velocity components attributable to the unperturbed system, and toroidal impurity velocity component attributable to the introduction of the external, axisymmetrical hydrogen source, the hydrogen ion source strength $1/\tau_s$ required to reverse the parallel flow of impurity ions into the plasma may be determined by solving Equation (8) for those conditions at which the second factor reverses the effect of the first factor:

$$\frac{1}{\tau_s} \geq \frac{2}{eRB_{To}}\left(\frac{1}{n_i}\frac{\partial p_i}{\partial r} - \frac{1}{n_1 Z_1}\frac{\partial p_I}{\partial r}\right) \sim \frac{2T_i}{eRB_{To} r} \tag{9}$$

This result may be qualitatively understood by considering that the external hydrogen source replenishes the protons lost by the toroidal magnetic drift, thus eliminating the circulation flow of impurity ions along the flux lines of the toroidal and poloidal magnetic field which otherwise would result in net impurity influx into the principal plasma region. It will be further seen that in practice the axisymmetrical hydrogen source should be adjacent the bottom of the plasma if the direction of the toroidal magnetic drift is assumed to be upward.

Furthermore, an axisymmetric limiter such as illustrated at number 40 in FIGS. 1 and 2 is placed adjacent the top of the plasma. At the limiter, the protons recombine at the surface and a part of the resultant neutral atoms will be reionized locally, before they spread in the vacuum chamber. At the same time, some impurity atoms will be injected from the limiter surface. Therefore the limiter acts as a net sink for the protons and a net source for the impurities. In the latter connection, means for evacuating the minor azimuthal zone adjacent the limiter is provided such as illustrated in FIGS.

1 and 2, in order to prevent impurity and hydrogen build-up.

In the embodiment illustrated in FIGS. 1 and 2 protons are supplied by injection of hydrogen gas and letting plasma ionize the hydrogen gas thus supplied. The hydrogen atoms will penetrate about an ionization mean path $\lambda$ which is given by $$\lambda = \frac{v_o}{n_e (\sigma_{ion} v_e)} \quad (10)$$

where $v_o$ is the initial velocity of the hydrogen atoms, $n_e$ is the electron density, $v_e$ is the electron velocity and $\sigma_{ion}$ is the ionization cross-section. For the typical Tokamak values of $v_o = 10^5$ cm/sec, $n_e = 10^{12}$ cm$^{-3}$ and $<\sigma_{ion} v_e> = 3 \times 10^{-8}$ cm$^3$sec$^{-1}$, $\lambda$ has a value of approximately 3 cm. The thru-put of protons, $\partial N/\partial t$, which enter the system from the hydrogen supply, strike the limiter and are evacuated from the system, is then given by $$\frac{\partial N}{\partial t} = 2\pi R \frac{2\pi r \lambda n_e T}{eBRr} \quad (11)$$

$$= (2\pi)^2 \frac{T}{eB} \frac{V_o}{(\sigma_{ion} v_e)} \simeq 10^{18} \frac{T}{eB}.$$

It should be noted that the value is independent of $n_e$ and the plasma size. For the typical Tokamak values of $T = 100$ eV, and $B = 40$ kG, the value of $\partial N/\partial t = 2.5 \times 10^{19}$ sec$^{-1}$.

The number of particles $N^h$ in the hot part of the plasma decays with the particle confinement time $\tau_p$, and the thru-put of protons in the hot plasma (leakage from the plasma) is given by $$\frac{\partial N^h}{\partial t} = \frac{n^h 2\pi R \pi r^2}{\tau_p}. \quad (12)$$

The ratio of the proton through-put to the plasma leakage through-put is given by $$\frac{\partial N}{\partial t} \Big/ \frac{\partial N^h}{\partial t} = \frac{\tau_p T}{n^h eBr^2} 6 \times 10^{16} \text{ m}^{-3} = \quad (13)$$

$$\frac{\tau_p}{\tau_{Bohm}} \left( \frac{10^{12} \text{ cm}^{-3}}{n^h} \right)$$

where $\tau_{Bohm} = 16 eBr^2/T$. Hence, if $\tau_p \gtrsim 100 \tau_{Bohm}$ and $n^h \simeq 3 \times 10^{13}$ cm$^{-3}$, the thru-put of particles at the surface is greater than the thru-put of particles of the main body of plasma. This demonstrates that this use of hydrogen to control impurities does not overly adversely affect the plasma system.

Since the required gas thru-put is not very large, there is a possibility that the localized gas supply may be masked by the uniform recycling of hydrogen from the wall of the containment vessel. Therefore, it is seen to be important that the top half wall is kept clean of hydrogen gas. The vacuum pumping ports are accordingly located at the top of the toroidal zone.

The energy balance may be calculated similarly to show that the hydrogen input does not overly adversely affect the energy balance. The energy available for ionizing and heating the gas is given by $eN^h T^h/\tau_E$ where $\tau_E$ is the energy confinement time of the hot plasma. This is compared with the energy required which is given by $\partial/\partial t N(3T + \epsilon)$, where $\epsilon$ is the ionization and excitation energy loss. The ratio is given by $$\frac{\partial}{\partial t} N(3T + \epsilon) \Big/ \left( \frac{3 N^h T^h}{\tau_E} \right) = \quad (14)$$

$$\frac{\tau_E}{\tau_{Bohm}} \left( \frac{10^{12} \text{cm}^{-3}}{n^h} \right) \left( \frac{T + \epsilon/3}{T^h} \right).$$

For the Tokamak values of $n_h = 3 \times 10^{13}$ cm$^{-3}$, $T^h \simeq 3$ keV, and $T + \epsilon/3 \simeq 100$ eV, enough energy is available if $\tau_E < 1000 \tau_{Bohm}$. Although the invention has been particularly analyzed with respect to a toroidal configuration with a circular cross-section, it will be appreciated that a similar analysis may be undertaken for other plasma cross-sections.

It will be further appreciated by those skilled in the art that while the invention has been described with respect to a particular embodiment, it may be appropriately applied to other toroidal plasma containment systems. Furthermore, while the specific hydrogen source and particle sink means have been described, other embodiments may be employed. For example, as illustrated in FIG. 3, a hydride source rail 60 symmetrically located adjacent the plasma 12 may be used as a source of hydrogen instead of a manifold system which meters the desired amount of hydrogen gas. Suitable hydride sources such as lithium hydride would provide a supply of hydrogen in the plasma environment, and may be designed to supply the appropriate hydrogen input level under the desired operational conditions.

Various other modifications of the invention will be apparent to those skilled in the art and are intended to be included with the scope of the present invention.

Various of the features of the invention are set forth in the following claims.

What is claimed is:

1. Toroidal plasma confinement apparatus having a positive ion toroidal magnetic drift in a direction along the major toroidal axis including means for the control of impurity flow into a hydrogen plasma comprising means for providing a toroidal magnetic field in which the plasma is embedded, means for providing a toroidal current in the plasma and for generating a poloidal magnetic field in which the plasma is embedded, means for providing an axisymmetric source of hydrogen in a minor azimuthal zone adjacent the plasma and displaced from the plasma in a direction along the major toroidal axis opposite the direction of positive ion toroidal drift, and an axisymmetric particle sink in a minor azimuthal zone adjacent the plasma and displaced from the plasma along the major toroidal axis in the direction of positive ion toroidal drift, the source strength of said axisymmetric source of hydrogen being at least $$\frac{2}{eRB_{T_o}} \left( \frac{1}{n_i} \frac{\partial p_i}{\partial r} - \frac{1}{n_I Z_1} \frac{\partial p_I}{\partial r} \right)$$

particles per second for reversal of impurity flow such that said source replenishes protons lost from the plasma by the positive ion toroidal drift to eliminate circulation flow of impurity ions along the flux lines of the toroidal and poloidal magnetic fields which otherwise would result in net impurity influx into the plasma.

2. A method for control of impurity flow into a toroidally confined plasma, comprising the steps of providing an axisymmetric source of hydrogen in a zone adjacent the plasma within the toroidal and poloidal magnetic field confining the plasma and displaced from the plasma in a direction along the major toroidal axis opposite the direction of positive ion toroidal drift, introducing hydrogen to said zone at a hydrogen source strength rate of at least $$\frac{2}{eRB_{T_o}} \left( \frac{1}{n_i} \frac{\partial p_i}{\partial r} - \frac{1}{n_I Z_1} \frac{\partial p_I}{\partial r} \right)$$

particles per second and ionizing said hydrogen through interaction with said plasma to replace protons lost by toroidal magnetic drift to eliminate circulation flow of impurity ions along flux lines of the toroidal and magnetic field which otherwise would result in net impurity influx into the plasma, neutralizing plasma particles in a zone adjacent the plasma and displaced from the plasma along the major toroidal axis in the direction of positive ion toroidal drift, and evacuating the plasma zone adjacent the zone of particle neutralization.

* * * * *